July 19, 1949.

L. H. CONGER, JR 2,476,826

METHOD OF WELDING BUNG-REINFORCING STRUCTURES FOR BARRELS

Filed Aug. 16, 1946

INVENTOR
LATHAM H. CONGER JR.

BY

ATTORNEYS

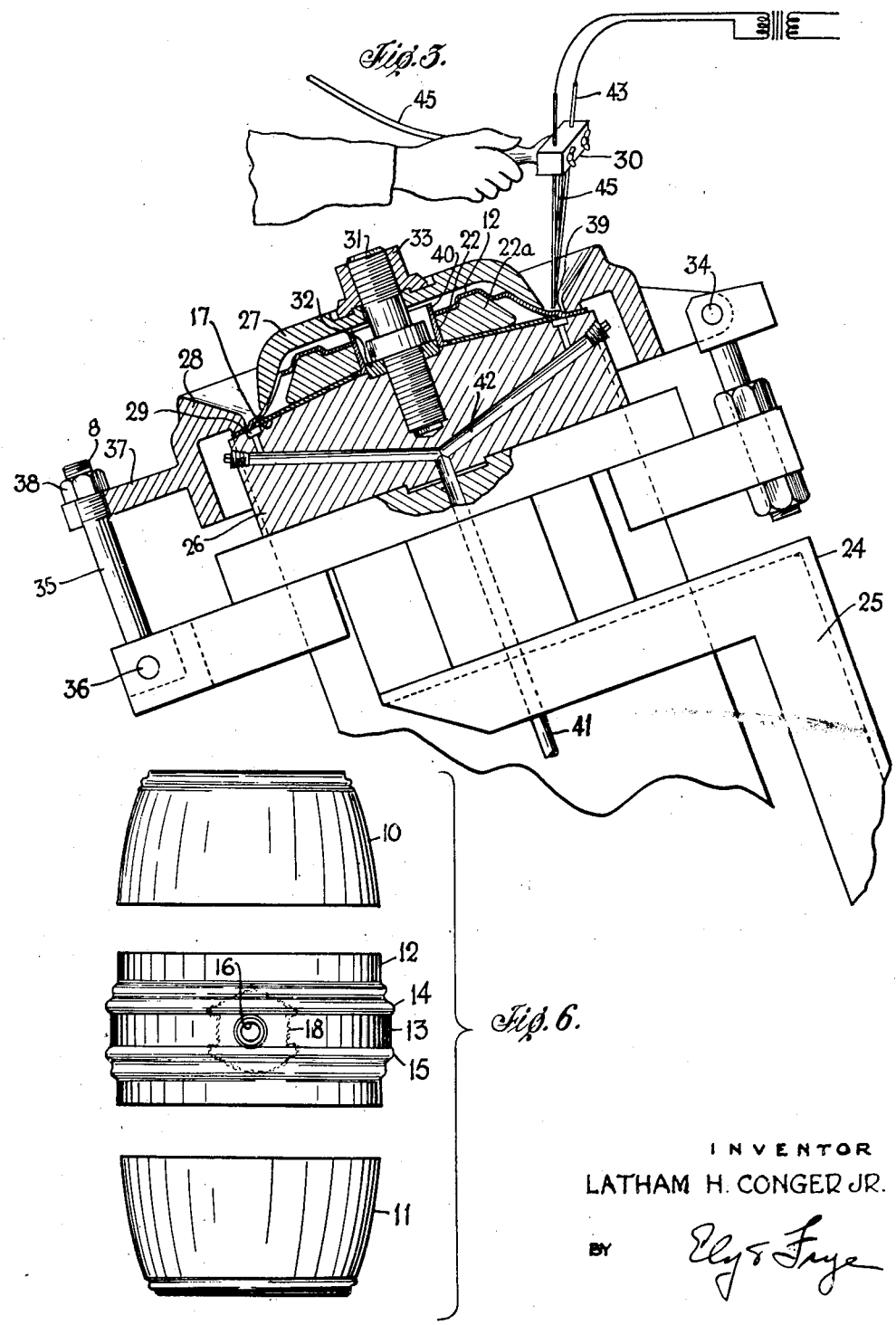

Patented July 19, 1949

2,476,826

UNITED STATES PATENT OFFICE 2,476,826

METHOD OF WELDING BUNG-REINFORCING STRUCTURES FOR BARRELS

Latham H. Conger, Jr., Akron, Ohio, assignor to The Firestone Tire & Rubber Company, Akron, Ohio, a corporation of Ohio Application August 16, 1946, Serial No. 691,084

4 Claims. (Cl. 113—120)

This invention relates to methods of making containers, and more specifically it relates to improved procedure for welding a bung reenforcing patch in position in a single walled barrel.

Single walled barrels ordinarily cost and weigh less than double walled barrels. The construction of these barrels heretofore in commercial use have either been too weak at the bung hole to withstand rough usage, or the bung hole area of the barrels have been reenforced. Pat. No. 2,381,386 issued August 7, 1945, to M. O. Kuhn discloses one method of reenforcing a single walled barrel. An object of the present invention is to provide a method of manufacturing a barrel of the same, or a similar construction, as disclosed in said Kuhn patent. More specifically, the invention aims to provide a single walled barrel of improved construction at the bung opening thereof.

While the invention will be discussed in reference to a barrel, it is to be understood that applicant does not limit his invention to barrels but that it is equally applicable to any type of container wherein its embodiment may be useful.

Other objects of the invention will be mainfest from the following specifications, particularly reference being directed to the accompanying drawings of which:

Fig. 3 shows the components of the container shown in Fig. 2 in a patch welding jig preparatory to welding, said welding jig being shown tilted at a predetermined angle;

Fig. 6 is a blown up view of a container illustrating the components of a barrel involving the present invention, the view being in elevation and on a reduced scale.

Figure 1:
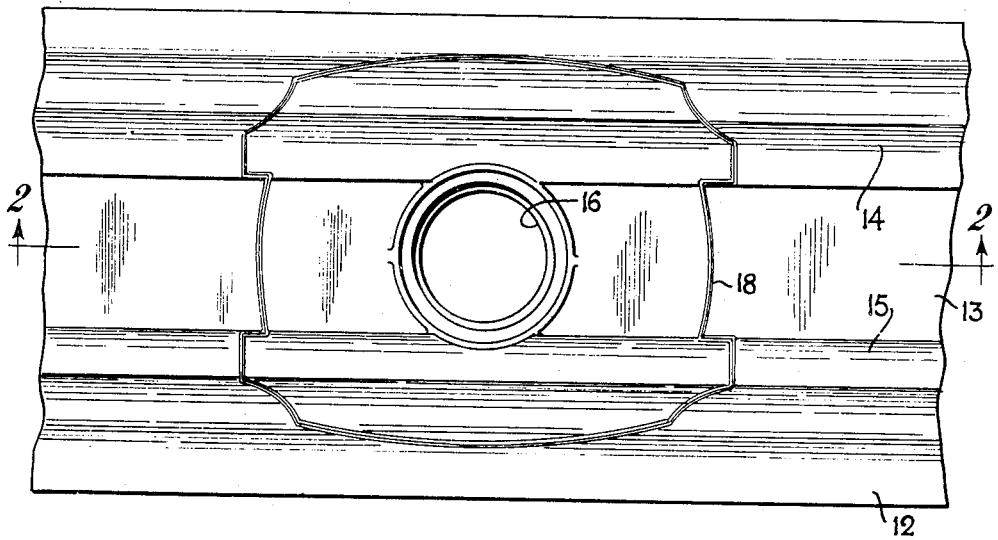
Fig. 1 is a plan view in the region of a bung portion of a center ring of a container embodying the present invention.
Figure 2:
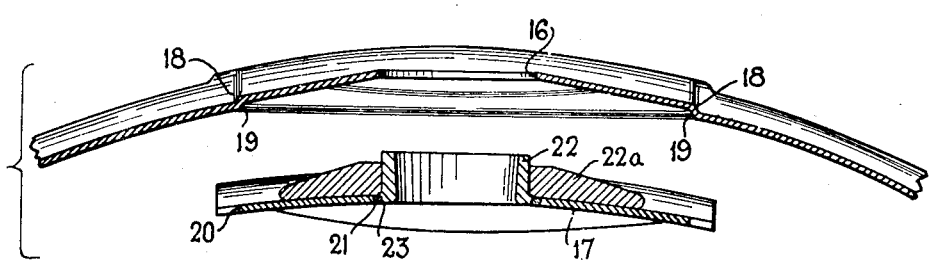
Fig. 2 is a sectional view taken on line 2—2 of Fig. 1 but shown blown up to better illustrate the assembly of a reenforcing patch, a bung liner and a bung reenforcement before those parts are welded to the center ring.
Figure 4:
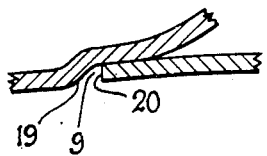
Fig. 4 is a sectional view illustrating the relative position of a shoulder and the edges of a bung reenforcing patch just before the welding operation.

Now to the drawings in detail it will be seen by reference to Fig. 6 that the wall of the barrel is composed of two tub-like end portions 10 and 11 and a center ring 12. Said center ring has its central portion 13 rolled radially outwardly with its marginal edges rolled further radially outwardly thereby forming spaced-apart, circumferentially extending roll rings 14 and 15 with a cylindrical surface 13 therebetween. After the ring 12 has been formed as just explained a bung opening 16 is punched centrally in said cylindrical surface 13. Simultaneously with the punching of the bung opening the outline 18 of a reenforcing plate or patch 17, best shown in Fig. 2, is embossed, by a suitable punch and die, the die in recess being against the outside surface of the center band 12 during the embossing operation. The outline 18 of said embossed portion is used as a marker for the application of a welding torch as will be explained later herein. Next the reenforcing patch 17 is stamped or otherwise fashioned so that its central portion is slightly concavo-convex, and its edge portion is contoured to make uninterrupted contact with the inside surface of the center band 12 about the bung opening 16. The outline 18 of the embossed portion conforms closely to the outline of patch 17 when patch 17 is placed in the position it will permanently occupy against the center band. The edge of said plate however extends to a line inwardly from a radially outwardly extending shoulder, or offset, 19 formed by the said embossing operation. It will be noted by reference to Fig. 4 that the shoulder 19 and the edge 20 of plate 17 define therebetween a narrow groove 9 as shown in Fig. 4. The depth of the emboss is the same, or approximately the same, as the thickness of the edge portion of plate 17. Simultaneously with the stamping of patch 17 an opening 21 is punched through the central portion thereof. A bung liner 22 is welded to the wall of said plate at 23 by any method found satisfactory as, for example, by a hydrogen fusion weld. If desired a suitable bung reenforcement 22a may be placed over the bung liner and retained in position by welding to adjacent portions of the assembly.

The center ring 12 and the patch 17 with the bung liner 22 and bung reenforcement 22a attached are next clamped in a welding jig which is designated in the drawing as a whole by the reference numeral 24 as will be seen by reference to Fig. 3. The jig 24 is supported on any suitable stand, not shown, and a frame 25, the jig further comprising a rest block 26, a patch clamp 27, and a clamp yoke 28. Since an atomic-hydrogen weld is to be made, as will be described later herein, the jig is provided with the necessary pipes, ducts, etc., connected to a source of hydrogen 41 whereby hydrogen is supplied through conduits 42 to a groove 29, in the rest block 26, which corresponds in configuration to the marginal outline of plate 17. A welding torch 30 is of the type used in making an atomic-hydrogen arc-weld, and includes a pair of electrodes 43 adapted to be brought together to strike an arc, and slightly separated thereafter. The arc is maintained in an oxygen-free condition by introduction of hydrogen through a conduit 45 to cause ignition of atmospheric oxygen around the arc, thereby preventing oxidation throughout the fusion zone. Hydrogen introduced through conduits 42 to groove 29 is maintained continuously ignited to remove oxygen throughout that portion of the fusion zone comprising marginal areas of plate 17 and the adjacent areas of center band 12.

A stud 31 is in threaded relation with and projects upwardly from the central portion of the rest block. The rest block is provided with a stud seat 32 which extends a short distance above the surface of the block and is of the proper diameter to fit snugly into the bung liner. The outer end of the stud 31 is threaded and receives in threaded relation a clamping nut 33.

The clamping yoke is hinged to frame 25 by a hinge pin 34 and is locked down by means of a hinged eye bolt 35 attached to the frame 25 by hinge pin 36. A slotted bolt-lug 37 projects outwardly from the side of said yoke. This lug receives bolt 35 and a nut 38 on the threaded end 8 of said eye bolt is adapted to be run down against said lug whereby the yoke is clamped against the outer surface of the center ring 12. In similar fashion the nut 33 is used to force clamp 27 tightly against the outside surface of band 12. To place the patch 17 and band 12 in position for welding, the yoke 28 is swung open on its hinge pin 34 and the jig clamp 27 is removed.

The patch 17 with its bung liner 22 attached and the bung reenforce 22ª in position is now placed in the jig with the stud seat 32 extending a short distance into the inner end of the bung liner and the complementary surfaces of the patch and the jig rest in matched cooperative relation which locates the patch in its predetermined position relative to the jig rest. The center band 12 is next placed in the jig on the patch with the bung liner 22 projecting through and a short distance beyond the bung opening and with the complementary surfaces of the center band and the jig in cooperative contact. By this method the patch 17, bung liner 22, reenforcement 22ª and the center ring are placed in proper position to be welded together.

Figure 5:
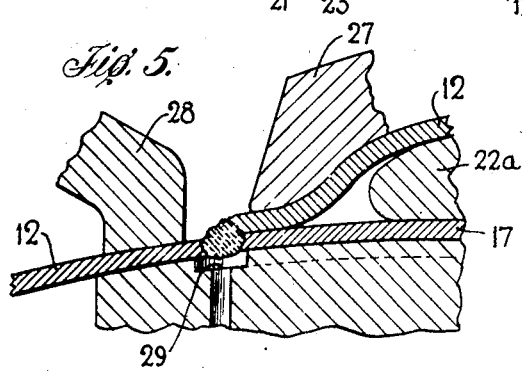
Fig. 5 is a sectional view, on a somewhat larger scale, illustrating the relative positions of the jig, the jig clamp, the welded seam, and the jig's hydrogen-conveying tubes and grooves.

The next step is placing clamp 27 in position on stud 31 and running down nut 33 forcing the clamp firmly against said band thereby clamping the band and patch against each other at the edges of the patch. Next the clamp yoke is closed against the outside surface of the band 12 and the eye bolt 35 swung into position in the slot of lug 37 and the nut 38 run down against the lug thus forcing the yoke firmly against said band and clamping the band between yoke and the jig support. It will be seen by reference to Figs. 3 and 5 that the edge of the clamp 27 is on the inside of and spaced apart a short distance from the yoke 28. Also that the edge of the embossed portion 18, the shoulder 19, the edge of the patch and the groove 29 all lie beneath and follow the outline of the space between said yoke and clamp. The nuts 33 and 38 are forcibly tightened down to reduce the amount of air between the contact areas of the patch and ring to a minimum in accordance with good welding practice. The said contact line between the center ring and the patch is unbroken.

The jig 24 is of the revolving type and is so tilted that a substantial horizontal welding position 39 is progressively presented along the embossed edge as such edge is rotated through said horizontal welding position. Hydrogen is turned into its course through the jig to the groove 29 where it flows upwardly to the said horizontal welding area at the top of the jig. This insures against the accumulation of oxygen and consequent explosion due to ignition from the welding torch. An atomic-hydrogen welding torch 30 is applied at the edge of the embossed portion and the jig is revolved so as to progressively move the entire embossed edge through said horizontal position and under the torch. In the present illustration the torch is manipulated manually but the invention contemplates performing the actual welding operation automatically.

By reference to Fig. 4 it will be seen that the thickness of patch 17 at its edge is approximately the same as the depth of the emboss so that there is no abrupt stepoff between the inside surfaces of the patch and the center band. It will also be noted by reference to Fig. 5 that during the welding operation, as described above, the molten metal has flowed into and filled the groove 9 just flush with the inside surfaces of the patch and center band.

Next the assembled center band, patch, bung liner and bung reenforcement is removed from the welding gig and the weld of the patch to the center band and the bung liner to the patch is tested for leaks by passing air under pressure through the bung opening or hole 16 around the bung liner 22 into the space or compartment between the patch and the center ring. The patch weld is also inspected for low spots and such spots, if any, are filled in by puddling, as will be understood by those familiar with fusion welding. The protruding end 40 of the bung liner is next pressed down against the outside surface of the ring 12 and is fusion welded thereto.

The end portions 10 and 11 are made by conventional drawing operations, and the center ring 12 is formed by expanding a circular metal band to the desired contour. The container portions 10 and 11 and the ring 12 are composed of a suitable metal such as stainless steel, and are united to each other by being butt welded together by the atomic-hydrogen method as will also be understood by those familiar with the art. The patch plate 17 and bung liner 22 is also stainless steel since those parts, like the walls of the end portions and the ring are exposed to the contents of the barrel. The content of the barrel does not contact the bung support 22ª and it may be composed of aluminum, steel or of any material found satisfactory.

It will now be seen that the bung structure described permits complete drainage of the barrel and that it provides insurance against contamination of the contents of a barrel or container from its contents leaking into and from the space between the patch 17 and the ring 12. Also that a sturdy, easily constructed container has been provided by the invention.

Modifications may be resorted to without departing from the spirit of the invention or the scope thereof as defined in the appended claims, which are not limited to the exact procedure described.

What is claimed is:

1. A method of constructing a single wall container which includes the steps of forming an annular center section, punching an aperture therein while simultaneously pressing outwardly a portion of said section adjacent said punched aperture to define an offset area for the reception of a bung reinforcing plate, forming an apertured bung reenforcing plate of a configuration for loose registered reception interiorly of said offset area with the aperture therein registered with the aperture of said center section, retaining said plate clamped to said center section within said offset area with a groove defined between the margins of said plate and the marginal surfaces of said offset area and applying welding heat externally of said center section marginally of said offset area to weld by heat conduction through said center section the margins of said plate to the inner surfaces of said offset area to fill the groove defined therebetween, while simultaneously subjecting the internal margins of said offset area and registered marginal portions of said plate to an atmosphere of inert gas.

2. In the manufacture of a single walled stainless steel container including an annular center section, the steps of simultaneously punching a bung aperture in said center section while forcing radially outwardly the wall of said section adjacent said aperture to define the marginal pattern of a bung reinforcing plate, forming a bung reinforcing plate of complemental pattern and provided centrally with a bung aperture, maintaining said plate in registered clamped engagement interiorly of said radially outward area of said section to define a groove therebetween, manipulating said center section to progressively move the margins of said radially outward area continuously through a welding position, continuously applying a welding torch to the outside surface of the center section while progressively following the outline of said raised portion, thereby causing molten metal to flow into and at least partially fill said groove, marginally to weld said plate to said center section.

3. A method of fabricating a single wall container including the steps of forming an annular center section of corrosion-resisting metal, cutting an aperture therein while simultaneously pressing outwardly a portion of said section marginally of said aperture to define a shallow well for the reception of a bung reinforcing plate, forming an apertured bung reinforcing plate of corrosion-resisting metal of a configuration for complemental loose fit centered reception within said well to define a groove therebetween, maintaining said plate in said well in clamped engagement with the inner walls thereof, maintaining the inner wall margins of said well and the complementally associated margins of said plate exposed to an atmosphere of inert gas, and applying an atomic hydrogen welding torch to the outer wall of said center section while manipulating said assembly in a manner continuously to subject and confine the applied welding heat to the areas of said section marginally defining said well whereby to marginally weld said plate to said center section and substantially fill said defined groove.

4. In the manufacture of a single walled metal container including an annular center section, the steps of simultaneously punching a bung aperture in said center section and raising radially outwardly the wall of said section approximating the outline of a bung reinforcing plate, forming a bung reinforcing plate provided with a bung aperture therein, clamping said plate against the inner surface of said section with the margins of said plate in registry with said radially raised wall portion, with the margin of said plate defining, with adjacent marginal areas of said portion, a channel therebetween, tilting and revolving said center section in a manner progressively to pass said channel defining areas through a welding position, and externally applying an atomic hydrogen welding torch to said center section at said welding position to fuse the affected areas passing through said welding position to cause metal to flow into and substantially fill said channel while marginally welding said plate to said center section.

LATHAM H. CONGER, Jr.

REFERENCES CITED

The following references are of record in the file of this patent:

UNITED STATES PATENTS

| Number | Name | Date |
| --- | --- | --- |
| 1,550,651 | Charter | Aug. 18, 1925 |
| 2,031,138 | Taylor | Feb. 18, 1936 |
| 2,133,796 | Battles | Oct. 18, 1938 |
| 2,339,544 | Stanley | Jan. 18, 1944 |
| 2,354,425 | Kuhn | July 25, 1944 |
| 2,381,385 | Kuhn | Aug. 7, 1945 |
| 2,381,386 | Kuhn | Aug. 7, 1945 |

FOREIGN PATENTS

| Number | Country | Date |
| --- | --- | --- |
| 503,655 | Great Britain | Apr. 12, 1939 |